United States Patent
Choi

(10) Patent No.: US 11,007,743 B2
(45) Date of Patent: May 18, 2021

(54) PUNCH-SEALING STRUCTURE FOR TABLET PRESS AND TABLET PRESS USING THE SAME

(71) Applicant: SEJONG PHARMATECH CO., LTD., Incheon (KR)

(72) Inventor: Dong Sik Choi, Incheon (KR)

(73) Assignee: SEJONG PHARMATECH CO., LTD., Incheon (KR)

( * ) Notice: Subject to any disclaimer, the term of this patent is extended or adjusted under 35 U.S.C. 154(b) by 554 days.

(21) Appl. No.: 15/570,114

(22) PCT Filed: Jun. 12, 2017

(86) PCT No.: PCT/KR2017/006106
§ 371 (c)(1),
(2) Date: Oct. 27, 2017

(87) PCT Pub. No.: WO2018/221771
PCT Pub. Date: Dec. 6, 2018

(65) Prior Publication Data
US 2018/0345615 A1    Dec. 6, 2018

(30) Foreign Application Priority Data
Jun. 1, 2017 (KR) .................. 10-2017-0068525

(51) Int. Cl.
| | |
|---|---|
| *B29C 43/36* | (2006.01) |
| *B30B 15/02* | (2006.01) |
| *B30B 11/08* | (2006.01) |
| *B30B 15/00* | (2006.01) |
| *B29C 43/50* | (2006.01) |

(52) U.S. Cl.
CPC ............ *B30B 15/026* (2013.01); *B30B 11/08* (2013.01); *B29C 2043/5084* (2013.01); *B30B 15/0088* (2013.01)

(58) Field of Classification Search
CPC . B29C 2043/5084; B30B 11/08; B30B 11/00; B30B 11/12; B30B 15/0023; B30B 9/3075; A61J 3/10
See application file for complete search history.

(56) References Cited

FOREIGN PATENT DOCUMENTS

| EP | 002186632 A1 * | 5/2010 |
|---|---|---|
| EP | 2186632 A1 | 5/2010 |
| KR | 20-0185929 Y1 | 6/2000 |
| KR | 10-0796908 B1 | 5/2010 |

OTHER PUBLICATIONS

International Search Report dated Feb. 28, 2018, for the corresponding PCT Application No. PCT/KR2017/006106, total 3 pages.

* cited by examiner

*Primary Examiner* — Thu Khanh T Nguyen
(74) *Attorney, Agent, or Firm* — Lucas & Mercanti, LLP

(57) ABSTRACT

The present invention provides a punch-sealing structure for a tablet press, the punch-sealing structure includes: a punch holder having a plurality of guide holes formed circumferentially with regular intervals; punches axially vertically moving through the guide holes of the punch holder; and sleeves magnetically coupled to the punch holder and sealing outer sides of the punches protruding from the guide holes of the punch holder.

16 Claims, 10 Drawing Sheets

FIG.1
Prior art
(a)
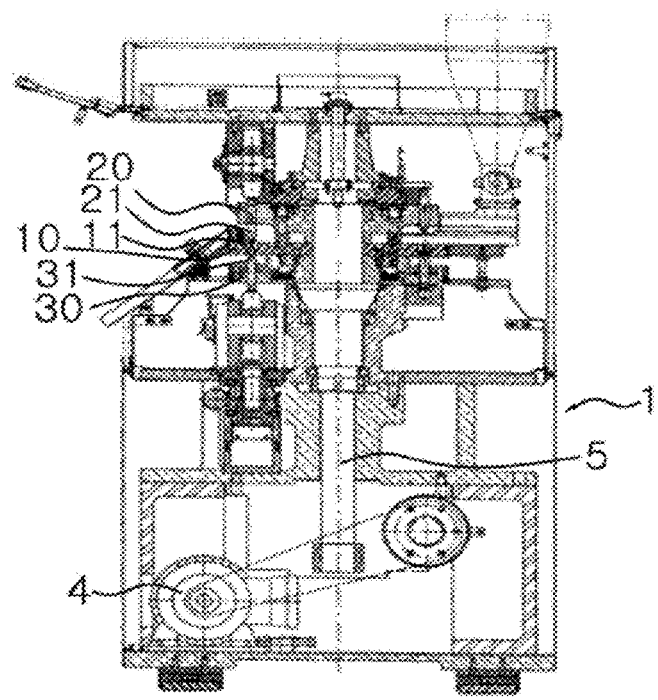
(b)
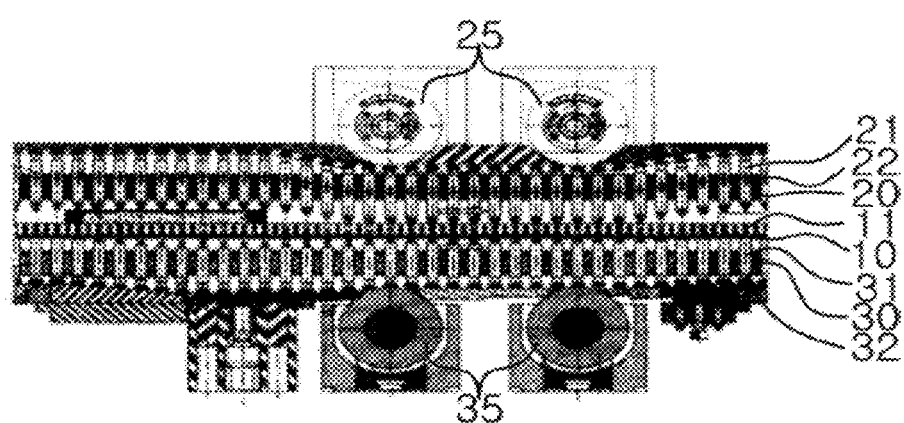

PUNCH-SEALING STRUCTURE FOR TABLET PRESS AND TABLET PRESS USING THE SAME

CROSS-REFERENCE TO RELATED APPLICATIONS

This application is a U.S. national stage of PCT/KR2017/006106, filed Jun. 12, 2017 which claims the priority from Korean Patent Application No. 10-2017-0068525, filed Jun. 1, 2017, the contents of each of which are incorporated herein by reference.

FIELD OF THE INVENTION

The present invention relates to a punch-sealing structure for a tablet press and a tablet press using the punch-sealing structure. More particularly, the present invention relates to a punch-sealing structure for a tablet press, the sealing structure preventing raw powder from being contaminated by sealing a guide hole through which a punch passes and the outer side of the punch so that a lubricant and foreign substances are not mixed with the raw powder in a tablet production process, and a tablet press using the punch-sealing structure.

BACKGROUND OF THE INVENTION

In general, tablets that are used in the pharmaceutical production field are produced by compressing raw powder or granule mixtures under high pressure.

A rotary type tablet press of the related art, as shown in FIGS. 1a and 1b, includes: a main disc 10 coupled to a rotary shaft 5 that is rotated by a main motor 4 in a body 1 and having a plurality of tablet production holes 11 on the same circumferential line; a top punch holder 20 and a bottom punch holder 30 disposed over and under the main disc 10, respectively, to correspond to the tablet production holes 11; and top punches 21 and bottom punches 31 axially reciprocating through the guide holes in the top punch holder and the bottom punch holder.

The top punches 21 and the bottom punches 31 are axially moved toward each other by driving units 25 and 35 to produce tablets by compressing raw powder loaded in the tablet production holes 11 of the main disc 10 and then are axially moved away from each other so that the produced tablets are ejected.

Since the top punches 21 and the bottom punches 31 are axially moved in the guide holes 22 and 32 formed in the top punch holder 20 and the bottom punch holder 30, a lubricant is supplied between the guide holes 22 and 32 and the punches 21 and 31 for smooth movement of the punches.

However, the lubricant supplied in the guide holes 22 and 32 may contaminate the raw powder loaded in the tablet production holes 11 of the main disc 10 by flowing to the raw powder. Further, foreign substances may flow inside through the gaps between the guide holes 22 and 32 and the punches 21 and 31, and the foreign substances flowing in the gaps may contaminate the raw powder loaded in the tablet production holes 11 of the main disc.

In order to solve this problem, a tablet press has been proposed in Korean Patent No. 10-0796908. The table press, as shown in FIG. 2, includes a sealing production member that is a concertina-shaped sleeve and fitted on the cylindrical body of each of the punches 21 and 31. In the sealing production member 40, a ring-shaped sealing portion 41 is formed at a first end of the concertina-shaped sleeve to be snapped to a supporting member 25 protruding from the punch holder and a ring-shaped portion 42 is formed at a second end of the concertina-shaped sleeve to be fitted in a ring-shaped groove 21a formed at an end of the punch.

However, according to the tablet press, since the sleeve is fitted on the supporting member 25 protruding downward from the pinch holder, the support member is separately formed. Further, it is complicated to couple the sleeve to the projective supporting member 22, so it is not easy to replace and cleanse the sleeve.

SUMMARY OF THE INVENTION

An object the present invention has been made to solve these problems.

An object of the present invention is to provide a punch-sealing structure for a tablet press and a table press using the punch-sealing structure, the sealing structure preventing contamination of raw powder by sealing a guide hole and the outer side of a punch to prevent a lubricant supplied for smooth movement of the punch for producing a tablet by compressing raw powder loaded in a tablet production hole of a main disc and foreign substances flowing inside through a guide hole for guiding the punch from flowing to the raw powder without interference with operation of the punch, and making it easy to replace and cleansing a sleeve by magnetically coupling the sleeve in a one-touch type using a coupler.

In order to achieve the object, a punch-sealing structure for a tablet press according to an aspect of the present invention includes sleeves magnetically coupled to a punch holder to seal punches moving through guide holes formed through the punch holder and circumferentially arranged.

A punch-sealing structure for a tablet press according to another aspect of the present invention includes: a punch holder having a plurality of guide holes formed circumferentially with regular intervals; punches axially vertically moving through the guide holes of the punch holder; and sleeves magnetically coupled to the punch holder and sealing outer sides of the punches protruding from the guide holes of the punch holder.

The sleeves may have a variable length depending on vertical movement of the punches.

The punch holder may be made of metal and a magnet may be disposed at the first end of the sleeve so that the punch holder and the sleeve are magnetically coupled.

The punch holder may be made of metal, a coupling groove exposed to the outside may be formed on an inner side of a lower end of the guide hole of the punch holder, and a magnet may be disposed at the first end of the sleeve, so the magnet at the sleeve is inserted and magnetically coupled in the coupling groove of the metallic punch holder.

The magnet may be coated with a coating material for protecting the magnet.

A coupling groove exposed to the outside may be formed on an inner side of a lower end of the guide hole of the punch holder, a magnet may be inserted in the coupling groove, and a metal member may be disposed at the first end of the sleeve, so the metal member at the sleeve is magnetically coupled to the magnet inserted in the coupling groove of the punch holder.

The punch holder may be made of metal so that the magnet inserted in the coupling groove is coupled to the punch holder.

A coupling groove exposed to the outside may be formed on an inner side of a lower end of the guide hole of the punch holder, a metal member may be inserted in the coupling groove, and a magnet may be disposed at the first end of the sleeve, so the magnet at the sleeve is magnetically coupled to the metal member inserted in the coupling groove of the punch holder.

The magnet and the metal member may be coated with a coating material.

A punch-sealing structure for a tablet press according to another aspect of the present invention includes: a punch holder having a plurality of guide holes formed circumferentially with regular intervals; punches axially vertically moving through the guide holes of the punch holder; and sleeves having a first end magnetically coupled to a first side of the punch holder and a second end magnetically coupled to a first end of the punches passing through the guide holes, and sealing outer sides of the punches protruding from the guide holes of the punch holder.

A punch-sealing structure for a tablet press according to another aspect of the present invention includes: a punch holder having a plurality of guide holes formed circumferentially with regular intervals; punches axially vertically moving through the guide holes of the punch holder; and sleeves coupled to the punch holder and sealing outer sides of the punches protruding from the guide holes of the punch holder, wherein the punch holder and the sleeve are coupled to each other through a coupler.

A bayonet joint having insertion grooves exposed to the outside and locking grooves circumferentially extending from ends of the insertion grooves may be fitted on an inner side of a lower end of the guide hole of the punch holder, and a circular ring having locking projections on an outer side thereof and inserted in the bayonet joint may be fitted on the first end of the sleeve, and when the sleeve is rotated in a predetermined direction with the locking projections of the circular ring inserted in the insertion grooves of the bayonet joint, the locking projections of the circular ring may be locked into the locking grooves, so the sleeve and the punch holder may be coupled to each other.

A coupling groove exposed to the outside may be formed on an inner side of a lower end of the guide hole of the punch holder and the bayonet joint may be fitted in the coupling groove.

A coupling groove exposed to the outside may be formed on an inner side of a lower end of the guide hole of the punch holder, a coupling block having a locking groove on an outer side of a lower end may be fitted in the coupling groove, and a fixing ring having a locking step inserted and locked in the locking groove of the coupling block may be fitted on the first end of the sleeve.

The locking groove of the coupling block may be formed on the outer side of the coupling bock to face an inner side of the coupling groove when the coupling block is fitted in the coupling groove, and the locking step of the sleeve may be fitted in close contact with the inner side of the coupling groove and the locking groove of the coupling block to be locked and fixed in the locking groove.

The locking step of the sleeve may be made of synthetic resin to have a predetermined level of elasticity.

A tablet press according to another aspect of the present invention includes: a main disc coupled to a rotary shaft of a main motor and having a plurality of tablet production holes on the same circumferential line; a hopper supplying raw powder into the tablet production holes of the main disc; and top and bottom punch assemblies disposed to face each other over and under the main disc, and each having a punch holder having guide holes formed to correspond to the tablet production holes of the main disc, punches being axially vertically moved through the guide holes of the punch holders by driving units, and sleeves magnetically coupled to the punch holders and sealing outer sides of the punches protruding from the guide holes of the punch holder.

A tablet press according to another aspect of the present invention includes: a main disc coupled to a rotary shaft of a main rotor 4 and having a plurality of tablet production holes on the same circumferential line; a hopper supplying raw powder into the tablet production holes of the main disc; and top and bottom punch assemblies disposed to face each other over and under the main disc, and each having a punch holder having guide holes formed to correspond to the tablet production holes of the main disc, punches being axially vertically moved through the guide holes of the punch holders by driving units, and sleeves coupled to the punch holders and sealing outer sides of the punches protruding from the guide holes of the punch holder, in which the punch holder and the sleeve are coupled to each other through a coupler.

According to the present invention, contamination of raw powder is prevented by sealing the guide hole and the outer side of the punch of a tablet press that produces tablets by compressing raw powder loaded in tablet production holes of a main disc so that a lubricant supplied for smooth movement of the punch and foreign substances flowing inside through the guide hole for guiding the punch cannot flow to the raw powder.

Further, the sleeve is a bellows-shaped body of which the length is variable with operation of punches and the first end or both ends of the sleeve are magnetically coupled to the punch holder or the first end of the punch, so the sleeve can be more easily attached and detached and more strongly coupled.

Further, since the first end or both end of the sleeve is coupled in a one-touch type to the punch holder or the first end of the punch through a coupler, the sleeve can be easily attached and detached.

Further, since the sleeve is magnetically coupled or coupled through a coupler, it is possible to more easily replace and cleanse the sleeve.

BRIEF DESCRIPTION OF DRAWINGS

FIGS. 1a and 1b are conceptual views illustrating the entire configuration of a common tablet press.

DETAILED DESCRIPTION OF THE INVENTION

Figure 2:
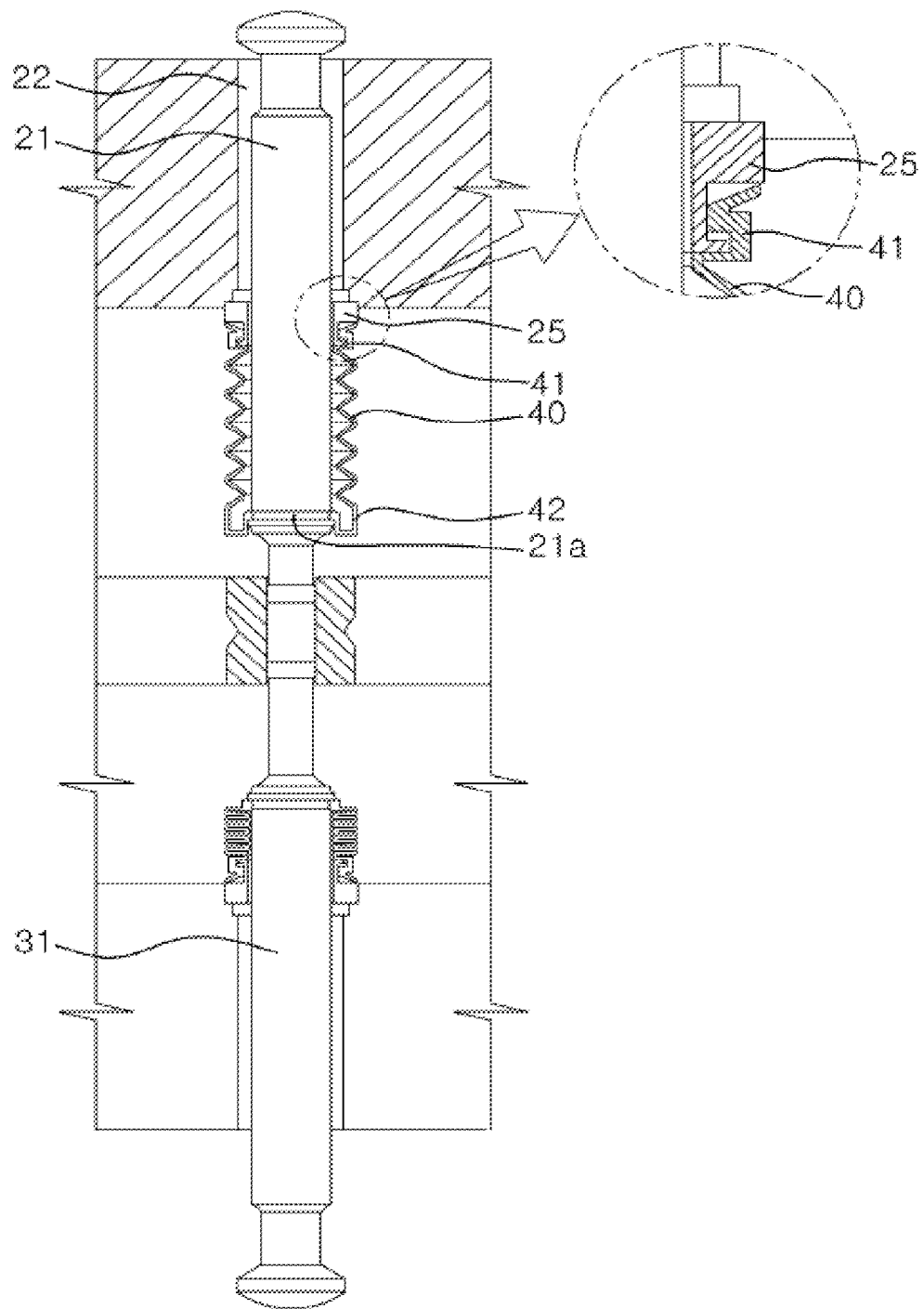
FIG. 2 is an enlarged view of main parts of a sealing structure for a punch used in a tablet press of the related art.

The objects, characteristics, and other advantages of the present invention will be made clear by explaining preferred embodiments of the present invention with reference to the accompanying drawings. A punch-sealing structure for a tablet press according to an embodiment of the present invention and a tablet press using the punch-sealing structure will be described in detail hereafter with reference to the accompanying drawings. Like reference numerals shown in the drawings indicate like components throughout the specification unless specifically stated.

A tablet press using a punch-sealing structure for a tablet press according to the present invention will be described with reference to FIG. 3, a first embodiment of a punch-sealing structure for a tablet press according to the present invention will be described with reference to FIG. 4, a second embodiment of a punch-sealing structure for a tablet press according to the present invention will be described with reference to FIG. 5, and a third embodiment of a punch-sealing structure for a tablet press according to the present invention will be described with reference to FIG. 4. Further, a fourth embodiment of a punch-sealing structure for a tablet press according to the present invention will be described with reference to FIG. 7, a fifth embodiment of a punch-sealing structure for a tablet press according to the present invention will be described with reference to FIG. 8, a sixth embodiment of a punch-sealing structure for a tablet press according to the present invention will be described with reference to FIG. 9, and a seventh embodiment of a punch-sealing structure for a tablet press according to the present invention will be described with reference to FIG. 10.

Figure 3:
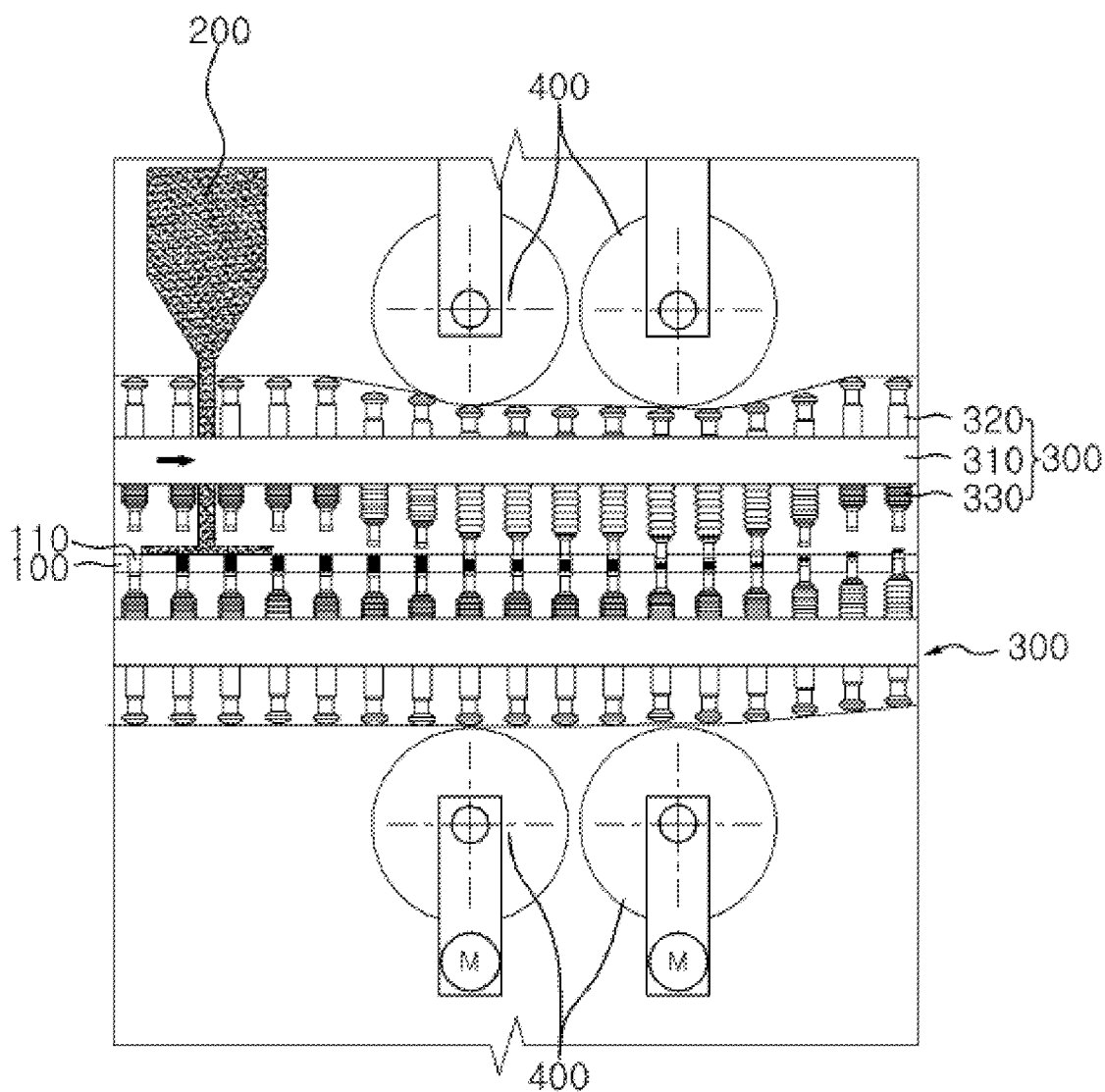
FIG. 3 is a partial enlarged view showing a tablet press using a punch-sealing structure for a tablet press according to an embodiment of the present invention.

First, as shown in FIG. 3, a tablet press according to the present invention includes: a main disc 100 coupled to a rotary shaft of a main motor (not shown) and having a plurality of tablet production holes 110 formed on the same circumference line; a hopper 200 supplying raw powder into the tablet production holes 110 of the main disc; and top and bottom punch assemblies 300 disposed over and under the main disc 100, respectively, and compressing raw powder loaded in the tablet production holes 110 of the main disc.

The top and bottom punch assemblies 300 each have: a punch holder 310 having guide holes 311 formed to correspond to the tablet production holes 110 of the main disc; punches 320 being axially vertically moved through the guide holes 311 of the punch holders 310 by driving units 400; and sleeves 330 having first ends coupled to first sides of the punch holders 310 and second ends coupled to first ends of the punches 320 to cover outer sides of the punches 320 protruding from the guide holes 311 of the punch holders 310 and seal the spaces between the guide holes 311 and the punches 320.

The punch holder 310 having the guide holes 311 is rotated around a rotary shaft of the main motor and the punches 320 are axially vertically moved through the guide holes 311 of the punch holders 310 by the driving units 400. That is, when the driving units 400 are operated, the punches 320 that are supposed to be vertically moved over and under the main disc 100 are moved toward each other to compress raw powder loaded in the tablet production holes 110 of the main disc and are then vertically moved away from each other so that the produced tablets are ejected.

The sleeve 330 has a first end coupled to the first side of the punch holder 310 and a second end coupled to the first end of the punch 320 passing through the guide hole 311, covers the outer side of the punch 320 protruding from the guide hole 311 of the punch holder 310, and seals the space between the guide hole 311 and the punch 320 in order to prevent a lubricant, which is supplied to the guide hole 311 for smooth movement of the punch 320 vertically moving in the guide hole 311 of the punch holder 310 from flowing down to the raw powder or to prevent dust or other foreign substances flowing in the gap between the guide hole 311 and the punch 320 from flowing to the raw powder.

The sleeve 330 is a bellows-shaped body of which the length is variable with operation of the punch 320 in order not to influence the vertical operation of the punch 320 and has detachable coupling portions at both ends of the bellows-shaped body.

In particular, the first side of the punch holder 310 and the first end of the sleeve 330 should be coupled in a one-touch type so that the sleeve 330 can be easily attached and detached and the sealing ability of the sleeve 330 can be improved. Further, the first side of the punch holder 310 and the first end of the sleeve 330 may be coupled by magnetism or by an attachment member in a one-touch type.

Figure 4:
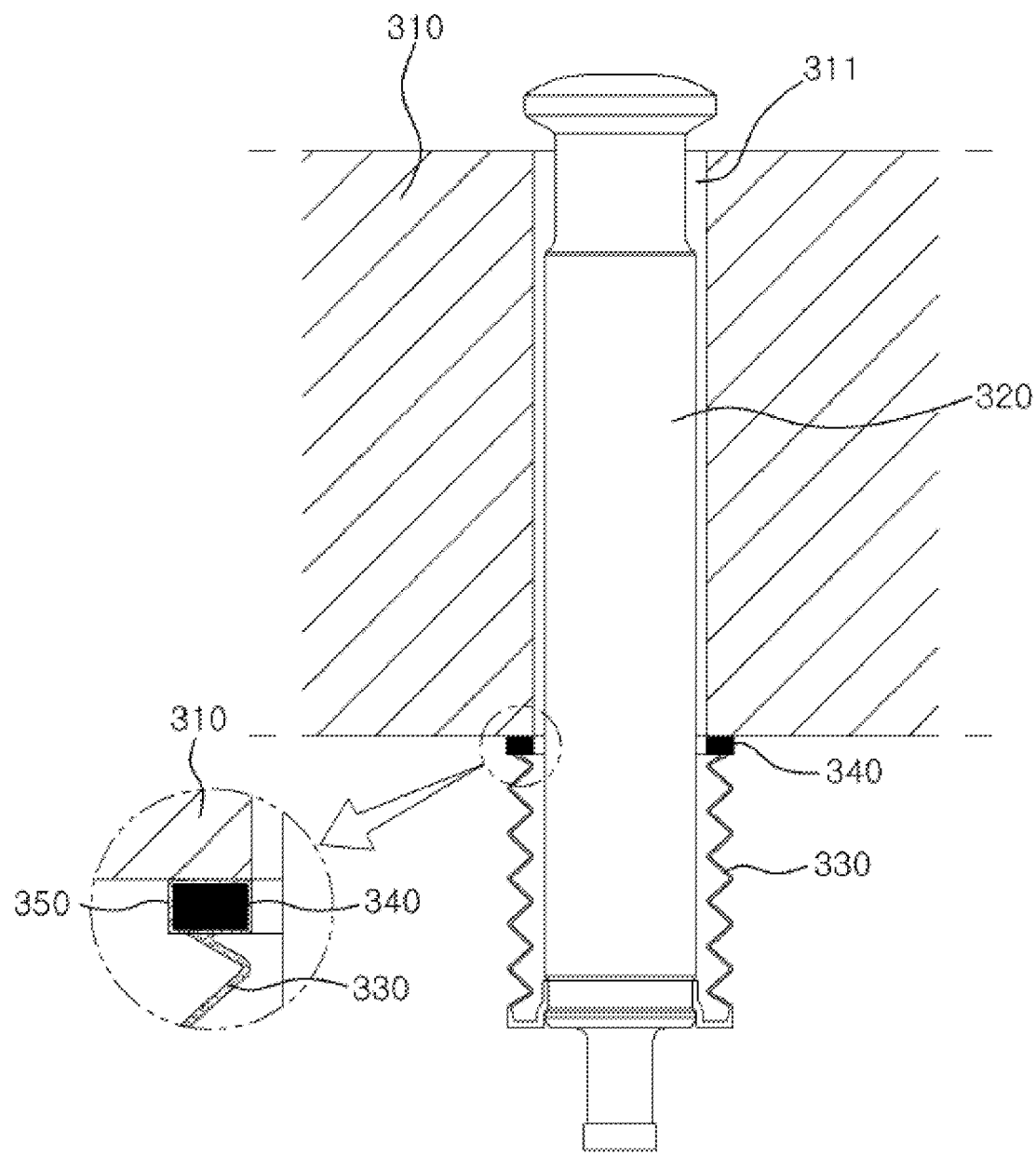
FIG. 4 is an enlarged view showing main parts of the punch-sealing structure for a tablet press according to a first embodiment of the present invention.

As shown in FIG. 4, according to the first embodiment of a punch-sealing structure for a tablet press, the punch holder 310 is made of metal and a magnet 340 is disposed around the first end of the sleeve 330 coupled to the punch holder 310, so the first side of the metallic punch holder 310 and the magnet 340 at the first end of the sleeve 330 are coupled in a one-touch type by magnetism.

The magnet 340 should not be easily detached after being attached to the metallic punch holder 310, so it should have magnetism such that it is not easily detached unless a predetermined level of external force is applied.

The magnet 340 is coated with a coating material 350 for protecting the magnet 340. The magnet may be not coated with the coating material, but covered with a separate coating member, and a coating layer may be formed on both of the sleeve and the magnet.

According to the first embodiment, as described above, the punch holder 310 is made of metal and the coupling portion at the first end of the sleeve 330 is implemented by the magnet 340, so the first end of the sleeve 330 is magnetically coupled to the punch holder 310. Accordingly, the sleeve 330 can be easily attached and detached and the structure is simplified, so not only manufacturing, but replacing and cleansing can become more convenient.

Figure 5:
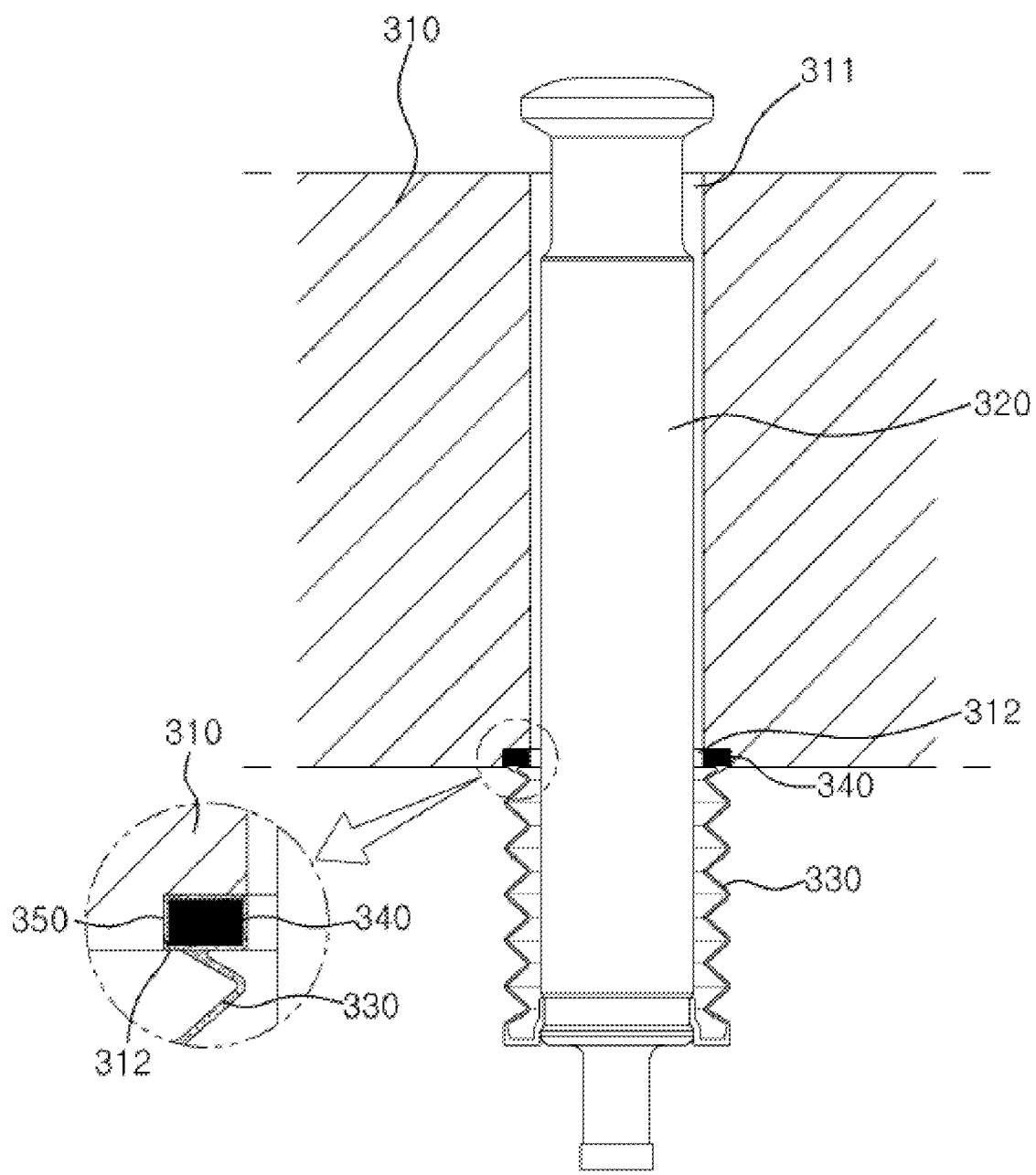
FIG. 5 is an enlarged view showing main parts of the punch-sealing structure for a tablet press according to a second embodiment of the present invention.

According to the second embodiment of a punch-sealing structure for a tablet press, as shown in FIG. 5, the punch holder 310 is made of metal and a coupling groove 312 exposed to the outer side is formed on the inner side of the lower end of the guide hole 311 of the punch holder 310. Further, a magnet 340 is disposed around the first end of the sleeve 330 coupled to the punch holder. The magnet 340 at the first end of the sleeve 312 is inserted and magnetically coupled in the coupling groove 312 of the metallic punch holder 310.

As described above, according to the second embodiment, since the magnet 340 at the first end of the sleeve 330 is inserted in the coupling groove 312 of the punch holder 310, the magnet 340 is retained in the metallic coupling groove 312 by magnetism without being exposed to the outside, so the punch holder 310 and the sleeve 330 can be conveniently coupled in a one-touch type under higher coupling force.

Figure 6:
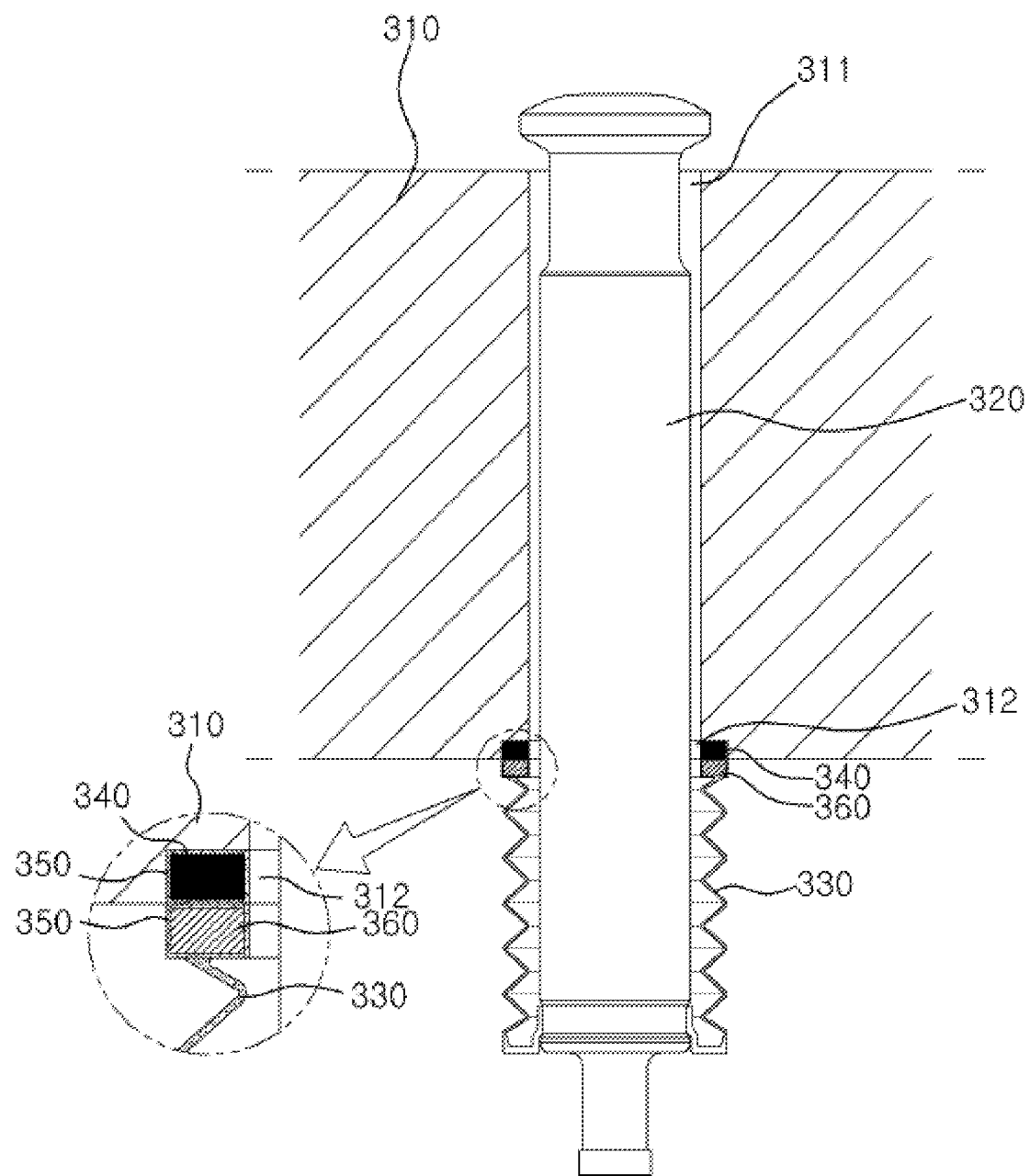
FIG. 6 is an enlarged view showing main parts of the punch-sealing structure for a tablet press according to a third embodiment of the present invention.

According to the third embodiment of a punch-sealing structure for a tablet press, as shown in FIG. 6, a coupling groove 312 exposed to the outside is formed on the inner side of the lower end of the guide hole 311 of the punch holder 310 and a magnet 340 is inserted in the coupling groove 312. Further, a metal member 360 is disposed around the first end of the sleeve 330. The metal member 360 at the first end of the sleeve 330 is magnetically attached to the magnet 340 inserted in the coupling groove 312 of the punch holder 310.

The punch holder 310 may be made of metal so that the magnet 340 inserted in the coupling groove 312 can be coupled thereto.

Further, the magnet 340 and the metal member 360 may be coated with a coating material 350 to protect the magnet 340 and the metal member 360 or may be covered with a separate coating member. A coating layer may be formed on both of the sleeve and the metal member at the first end of the sleeve.

As described above, according to the third embodiment, the magnet 340 is inserted in the coupling groove 312 of the punch holder 310 and the metal member 360 is disposed at the first end of the sleeve 330, so the magnet 340 and the metal member 360 are magnetically attached to each other. Accordingly, the sleeve 330 can be easily attached and detached. Further, since the magnet 340 is inserted in the coupling groove 312 of the punch holder 310, the magnet 340 is protected.

Figure 7:
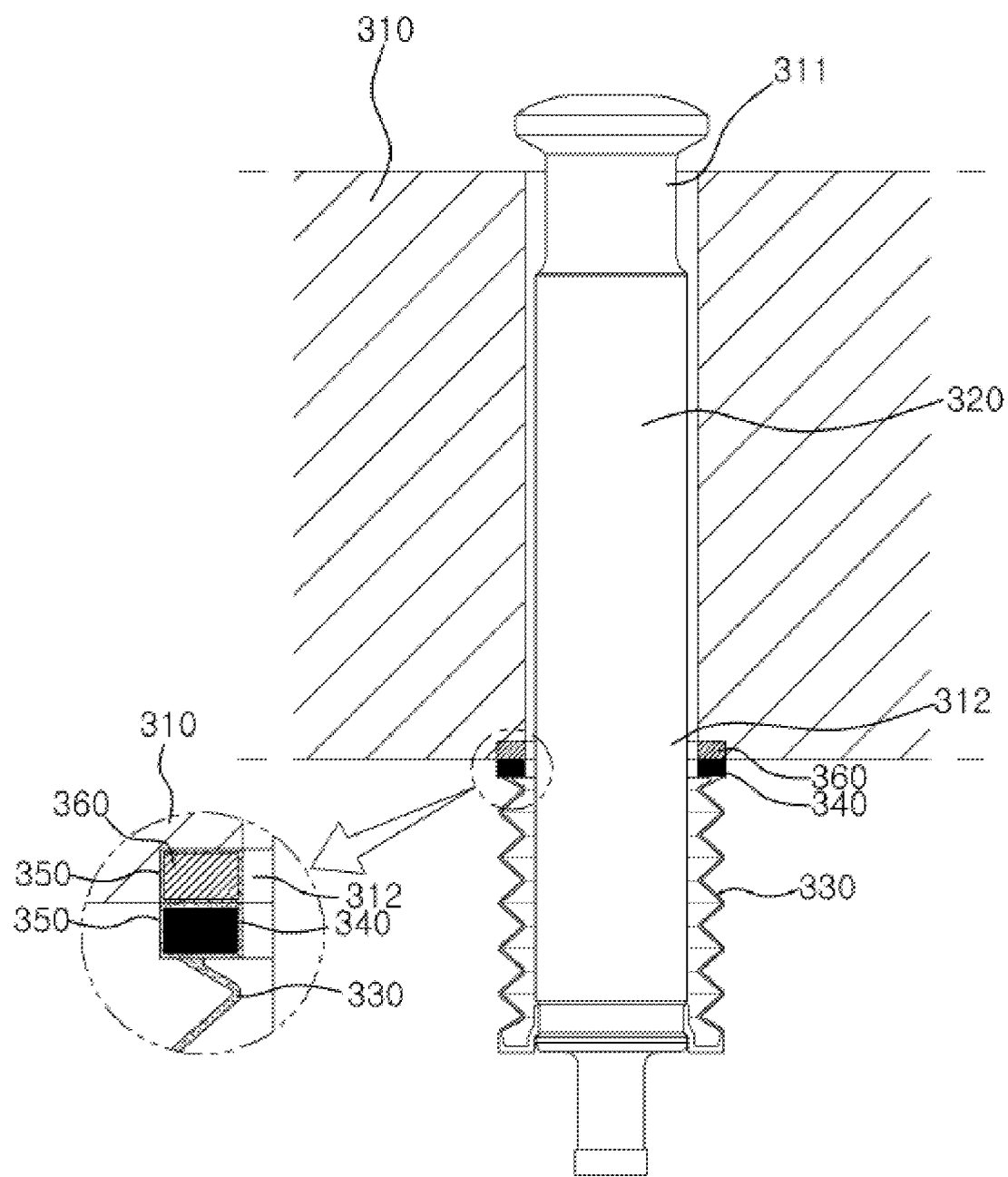
FIG. 7 is an enlarged view showing main parts of the punch-sealing structure for a tablet press according to a fourth embodiment of the present invention.

According to the fourth embodiment of a punch-sealing structure for a tablet press, as shown in FIG. 7, a coupling groove 312 exposed to the outside is formed on the inner side of the lower end of the guide hole 311 of the punch holder 310 and a metal member 360 is inserted in the coupling groove 312. Further, a magnet 340 is disposed around the first end of the sleeve 330. The metal member 340 at the first end of the sleeve 330 is magnetically attached to the metal member 360 inserted in the coupling groove 312 of the punch holder 310.

Further, the magnet 340 and the metal member 360 may be coated with a coating material 350 to protect the magnet 340 and the metal member 360 or may be covered with a separate coating member. A coating layer may be formed on both of the sleeve and the magnet at the first end of the sleeve.

The punch holder 310 may be made of synthetic resin so that the metal member 360 inserted in the coupling groove 312 and the magnet 340 at the first end of the sleeve 330 are attached to each other. If the punch holder 310 is made of metal, the magnet 340 at the sleeve 330 may be freely attached not to the metal member 360 in the coupling groove 312, but to the first side of the punch holder 310, so it is preferable that the punch holder 310 is made of synthetic resin in the fourth embodiment.

Figure 8:
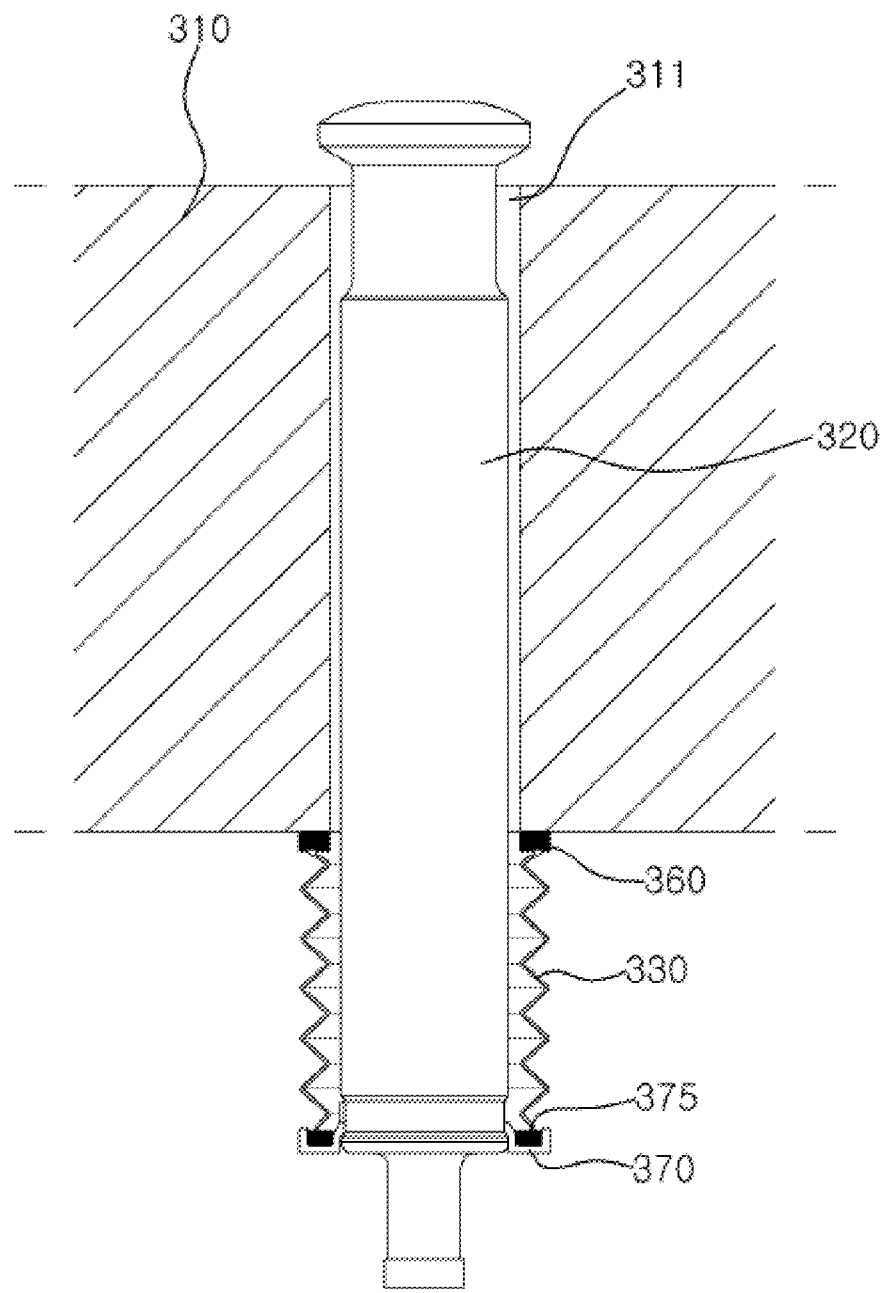
FIG. 8 is an enlarged view showing main parts of the punch-sealing structure for a tablet press according to a fifth embodiment of the present invention.

As shown in FIG. 8, the fifth embodiment of a sealing structure for punches of a tablet press includes: a punch holder 310 having a plurality of guide holes 311 formed circumferentially with regular intervals; punches 320 being axially vertically moved through the guide holes 311 of the punch holder 310; and a sleeve 330 having a first end magnetically coupled to a first side of the punch holder 310 and a second end magnetically coupled to a first end of the punch 320 to cover outer side of the punch 320 protruding from the guide hole 311 of the punch holder 310 and seal the space between the guide hole 311 and the punch 320.

The magnetic coupling between the first end of the sleeve 330 and the punch holder 310 and between the second end of the sleeve 330 and the first end of the punch 320 protruding from the guide hole 311 of the punch holder 310 may include the configurations according to the first to fourth embodiments.

For example, the second end of the sleeve 330 and the first end of the punch 320 protruding from the guide hole 11 of the punch holder 310 may be magnetically coupled by disposing a metallic or magnetic channel 370 at the first end of the punch 320 and disposing a metallic or magnetic coupling portion 375 at the second end of the sleeve 330 to correspond to the channel 370 so that the coupling portion 375 at the second end of the sleeve and thee channel 370 at the first end of the punch 320 are coupled to each other by magnetism.

As described above, according to the fifth embodiment, the first end of the sleeve 330 is magnetically coupled to the punch holder 310 and the second of the sleeve 330 is magnetically coupled to the first end of the punch 320 protruding from the guide hole 311, so the sleeve can be easily attached and detached.

Figure 9:
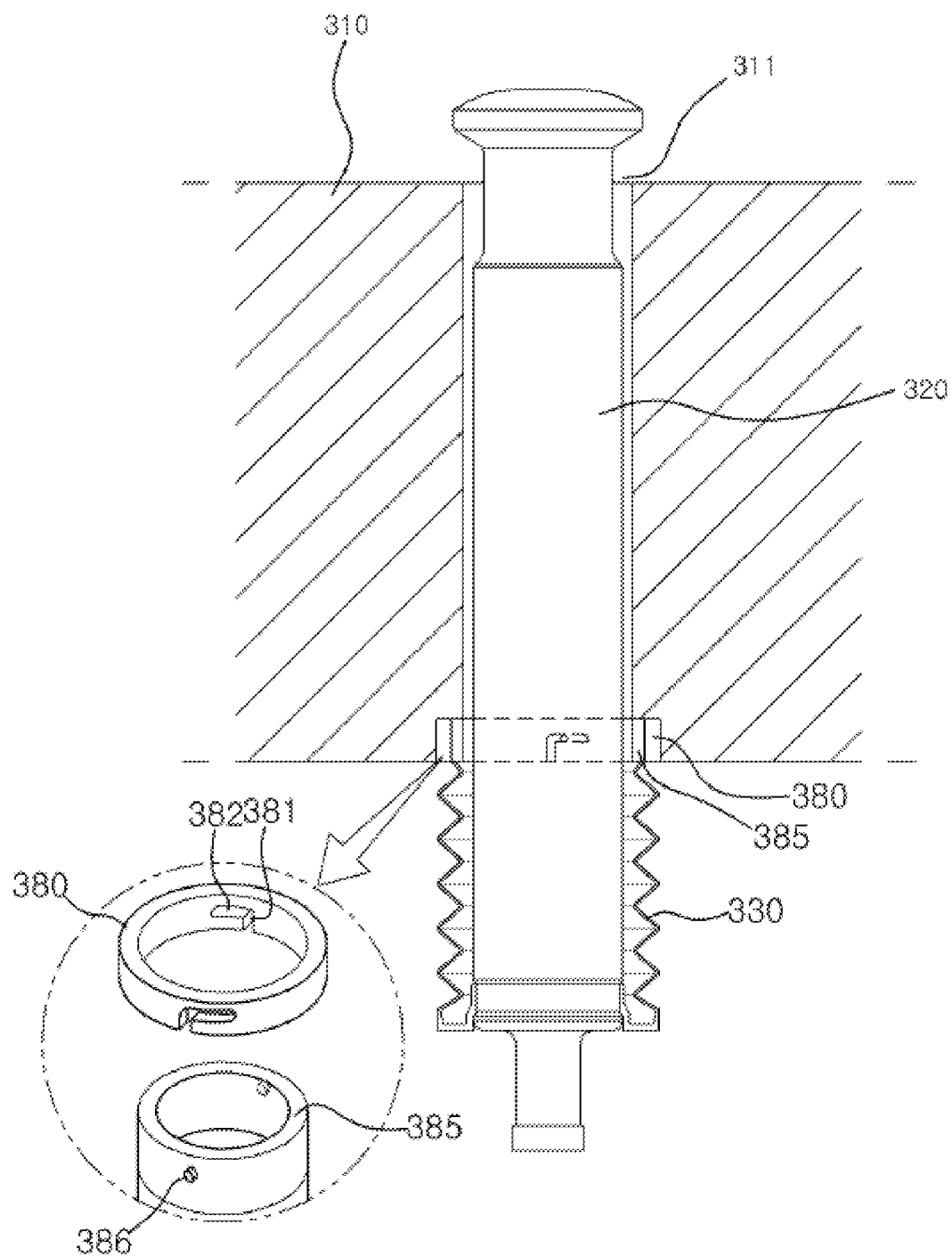
FIG. 9 is an enlarged view showing main parts of the punch-sealing structure for a tablet press according to a sixth embodiment of the present invention.
Figure 10:
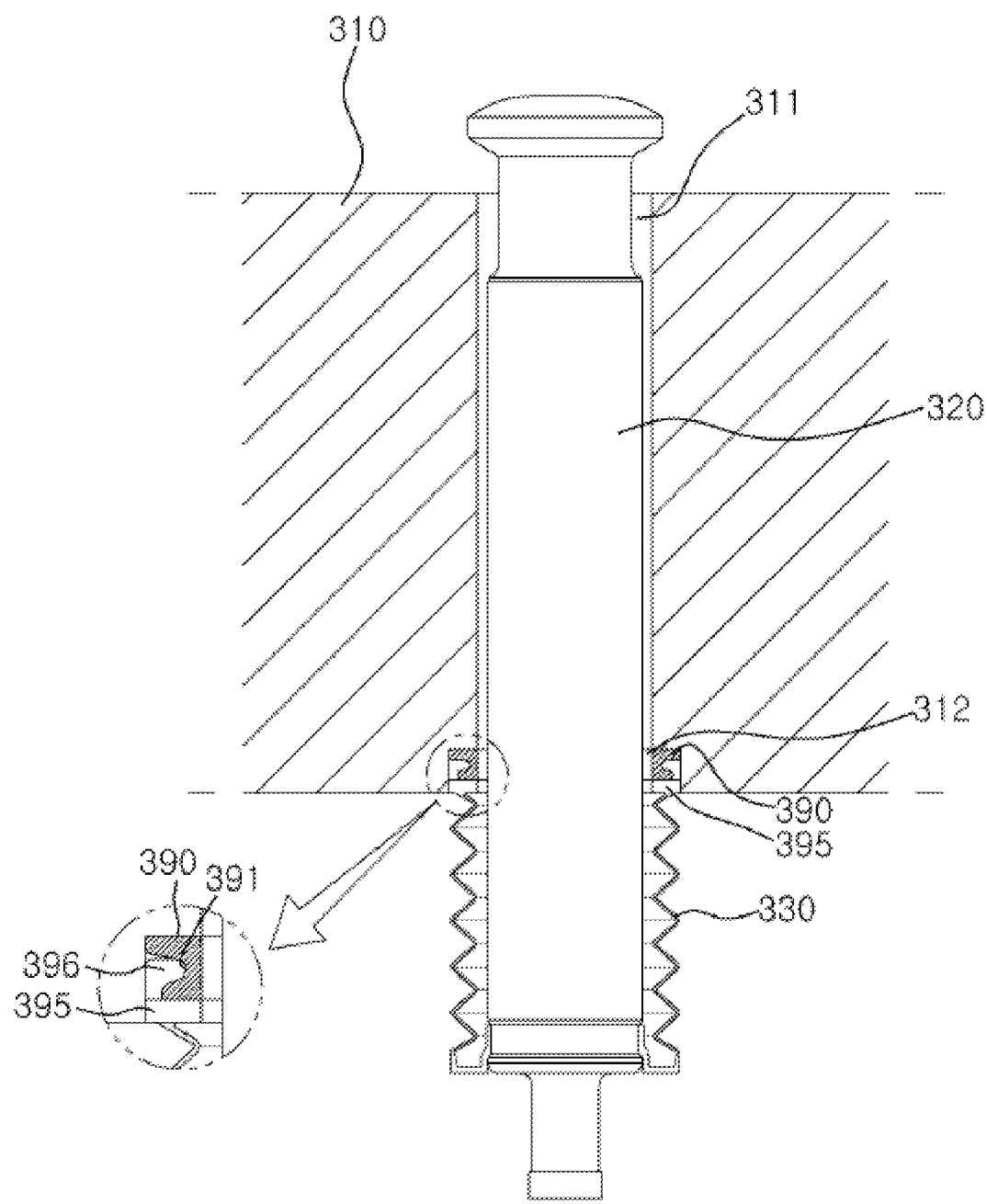
FIG. 10 is an enlarged view showing main parts of the punch-sealing structure for a tablet press according to a seventh embodiment of the present invention.

Further, as shown in FIGS. 9 and 10, in the punch-sealing structure for a tablet press, the first side of the punch holder and the first end of the sleeve may be coupled by a coupler.

As shown in FIG. 9, according to the sixth embodiment of a punch-sealing structure for a tablet press, a bayonet joint 380 is fitted on the inner side of the lower end of the guide hole 311 of the punch holder 310 and a circular ring 385 inserted in the bayonet joint 380 is disposed at the first end of the sleeve 330.

The bayonet joint 380 has insertion grooves 381 formed through the cylindrical wall thereof to be exposed to the outside and locking grooves 382 circumferentially extending from ends of the insertion grooves. The circular ring 385 at the first end of the sleeve 330 has locking projections 386.

When the sleeve 330 is rotated in a predetermined direction with the locking projections 386 of the circular ring 385 inserted in the insertion grooves 381 of the bayonet joint 380, the locking projections 386 of the circular ring are locked into the locking grooves 382, whereby the sleeve 330 and the punch holder 310 are coupled.

The bayonet joint 380 may be inserted in the lower end of the guide hole 311 of the punch holder 310, but a coupling groove 312 exposed to the outside may be formed on the inner side of the lower end of the guide hole 311 of the punch holder 310 and the bayonet joint 380 may be fitted in the coupling groove 312.

According to the seventh embodiment of a punch-sealing structure for a tablet press, as shown in FIG. 10, a coupling groove 312 exposed to the outside is formed on the inner side of the lower end of the guide hole 311 of the punch holder 310 and a coupling block 390 having a locking groove 391 on the outer side of the lower end is fitted in the coupling groove 312. Further, a fixing ring 395 having a locking step 396 inserted and locked in the locking groove 391 of the coupling block 390 is fitted on the first end of the sleeve 330.

The locking groove 391 of the coupling block 390 may be formed on the outer side of the coupling block 390 to face the inner side of the coupling groove 312 when the coupling block 390 is fitted in the coupling groove 312. The locking step 396 of the fixing ring 395 of the sleeve 330 may be fitted in close contact with the inner side of the coupling groove 312 and the locking groove 391 of the coupling block to be locked and fixed in the locking groove 391.

The locking step 396 of the sleeve 330 may be made of synthetic resin having a predetermined level of elasticity to be separably fitted in the locking groove 391 of the coupling block.

As described above, according to the sixth and seventh embodiments, since the punch holder 310 and the sleeve 330 are coupled to be easily separated using a coupler such as a bayonet joint 380 or the coupling block 390, replacing and cleansing can be conveniently performed.

As described above, according to the present invention, contamination of raw powder is prevented by sealing the guide hole and the outer side of the punch of a tablet press that produces tablets by compressing raw powder loaded in tablet production holes of a main disc so that a lubricant supplied for smooth movement of the punch and foreign substances flowing inside through the guide hole for guiding the punch cannot flow to the raw powder.

Further, the sleeve has a bellows-shaped body of which the length is variable with operation of punches and the first end or both ends of the sleeve are magnetically coupled to the punch holder or the first end of the punch, so the sleeve can be more easily attached and detached and more strongly coupled.

Further, since the first end or both end of the sleeve is coupled in a one-touch type to the punch holder or the first end of the punch through a coupler, the sleeve can be easily attached and detached.

Further, since the sleeve is magnetically coupled or coupled through a coupler, it is possible to more easily replace and cleanse the sleeve.

Although preferred embodiments of the present invention were described above, the present invention is not limited to the specific embodiments. That is, the present invention may be changed and modified in various ways by those skilled in the art without departing from the scope and spirit of the present invention described in the following claims, and all the appropriate changes and modifications should be construed as being included in the present invention as equivalents.

The present invention can be used in various tablet presses.

The invention claimed is:

1. A punch-sealing structure for a tablet press, comprising:
    a punch holder having a plurality of guide holes formed circumferentially with regular intervals;
    punches axially vertically moving through the guide holes of the punch holder; and
    sleeves magnetically coupled to the punch holder and sealing outer sides of the punches protruding from the guide holes of the punch holder,
    wherein
        a coupling groove exposed to the outside is formed on an inner side of a lower end of each of the guide hole of the punch holder,
        said coupling groove contains only a magnet inserted therein, and
        a metal member is inseparably integrated into the first end of the sleeve, so the metal member at the sleeve is magnetically coupled to the magnet inserted in the coupling groove of the punch holder.

2. The punch-sealing structure of claim 1, wherein said sleeves have a first end magnetically coupled to a first side of the punch holder and a second end magnetically coupled to a first end of the punches disposed through the guide holes.

3. The punch-sealing structure of claim 1, wherein the sleeves have a variable length depending on vertical movement of the punches.

4. The punch-coupling structure of claim 1, wherein the punch holder is made of metal and a magnet is disposed at the first end of each of the sleeves so that the punch holder and the sleeves are magnetically coupled.

5. The punch-sealing structure of claim 1, wherein the punch holder is made of metal, a coupling groove exposed to the outside is formed on an inner side of a lower end of each of the guide holes of the punch holder, and a magnet is disposed at the first end of each of the sleeves, so the magnet at each of the sleeves is inserted and magnetically coupled in the coupling groove of the metallic punch holder.

6. The punch-sealing structure of claim 4, wherein the magnet is coated with a coating material for protecting the magnet.

7. The punch-sealing structure of claim 1, wherein the punch holder is made of metal so that the magnet inserted in the coupling groove is coupled to the punch holder.

8. The punch-sealing structure of claim 1, wherein a coupling groove exposed to the outside is formed on an inner side of a lower end of each of the guide holes of the punch holder, a metal member is inserted in the coupling groove, and a magnet is disposed at the first end of each of the sleeves, so the magnet at each of the sleeves is magnetically coupled to the metal member inserted in the coupling groove of the punch holder.

9. The punch-sealing structure of claim 1, wherein the magnet and the metal member are coated with a coating material.

10. The punch-sealing structure of claim 1, wherein a bayonet joint having insertion grooves exposed to the outside and locking grooves circumferentially extending from ends of the insertion grooves is fitted on an inner side of a lower end of each of the guide holes of the punch holder, and a circular ring having locking projections on an outer side thereof and inserted in the bayonet joint is fitted on the first end of each of the sleeves, and
    when the sleeves are rotated in a predetermined direction with the locking projections of the circular ring inserted in the insertion grooves of the bayonet joint, the locking projections of the circular ring are locked into the locking grooves, so the sleeves and the punch holder are coupled to each other.

11. The punch-sealing structure of claim 10, wherein a coupling groove exposed to the outside is formed on an inner side of a lower end of each of the guide holes of the punch holder and the bayonet joint is fitted in the coupling groove.

12. The punch-sealing structure of claim 1, wherein a coupling groove exposed to the outside is formed on an inner side of a lower end of each of the guide holes of the punch holder, a coupling block having a locking groove on an outer side of a lower end is fitted in the coupling groove, and a fixing ring having a locking step inserted and locked in the locking groove of the coupling block is fitted on the first end of each of the sleeves.

13. The punch-sealing structure of claim 12, wherein the locking groove of the coupling block is formed on the outer side of the coupling bock to face an inner side of the coupling groove when the coupling block is fitted in the coupling groove, and the locking step of the sleeves is fitted in close contact with the inner side of the coupling groove and the locking groove of the coupling block to be locked and fixed in the locking groove.

14. The punch-sealing structure of claim 12, wherein the locking step of the sleeve is made of synthetic resin to have a predetermined level of elasticity.

15. A tablet press comprising:
    a main disc coupled to a rotary shaft of a main motor and having a plurality of tablet production holes on the same circumferential line;

a hopper supplying raw powder into the tablet production holes of the main disc; and top and bottom punch assemblies disposed to face each other over and under the main disc, and each having the punch sealing structure of claim 2 wherein the punch holder having guide holes formed to correspond to the tablet production holes of the main disc, punches being axially vertically moved through the guide holes of the punch holder by driving units, and sleeves magnetically coupled to the punch holder and sealing outer sides of the punches protruding from the guide holes of the punch holder.

16. A tablet press comprising:

a main disc coupled to a rotary shaft of a main motor and having a plurality of tablet production holes on the same circumferential line;

a hopper supplying raw powder into the tablet production holes of the main disc; and top and bottom punch assemblies disposed to face each other over and under the main disc, and each having the punch sealing structure of claim 1 wherein the punch holder having guide holes formed to correspond to the tablet production holes of the main disc, punches being axially vertically moved through the guide holes of the punch holder by driving units, and sleeves coupled to the punch holders and sealing outer sides of the punches protruding from the guide holes of the punch holder, wherein the punch holder and the sleeve are coupled to each other through a coupler.

* * * * *